Patented June 9, 1931

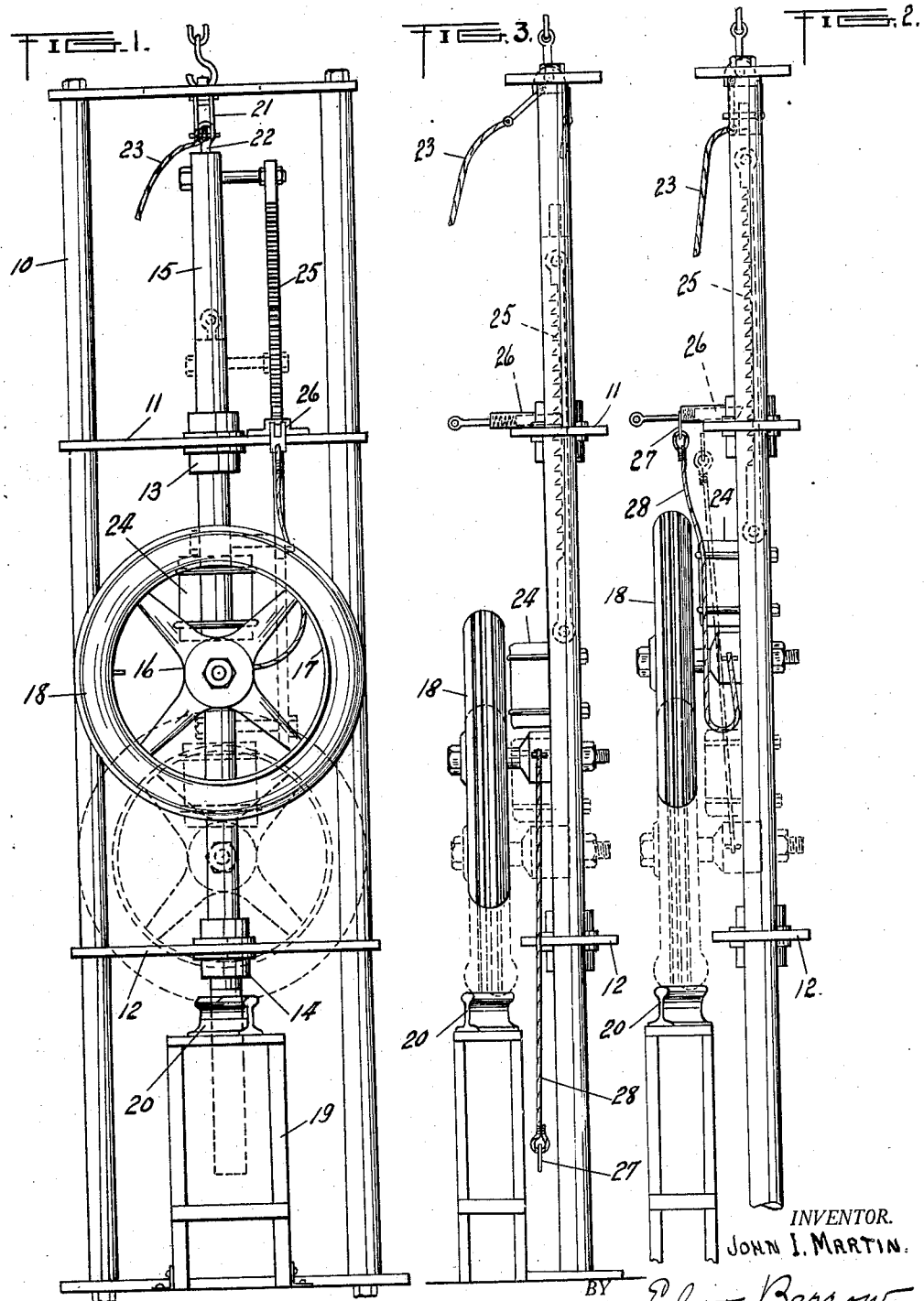

1,809,347

UNITED STATES PATENT OFFICE

JOHN I. MARTIN, OF AKRON, OHIO, ASSIGNOR TO THE FIRESTONE TIRE & RUBBER COMPANY, OF AKRON, OHIO, A CORPORATION OF OHIO

TIRE TESTING MACHINE

Application filed May 31, 1928. Serial No. 281,787.

This invention relates to tire testing machines and specifically to a construction for testing the effect of impact upon an inflated tire.

An object of the invention is to devise a testing machine to submit an inflated pneumatic tire to an impact, simulating the impact effect of a tire coming into forcible contact with a curb, a railroad track or other obstruction which tends to flatten a very small portion of the tire and cause what is known as a bruise-break in the tire casing. Such bruise-breaks are the result of very sharp bending or flexing of the sidewall of the tire, and of the pinching of the sidewall between the obstruction and the tire rim. By testing the tire and studying the effect of sharp flexing and pinching of the sidewalls thereof certain improvements can be made in the tire construction tending to eliminate such bruise-breaking. A further object is to devise means for dropping a weighted inflated tire upon a blunt obstruction. Another object is to devise means for automatically arresting the tire upon its rebound to prevent a second impact against the obstruction.

The foregoing and other objects are obtained by the construction illustrated in the accompanying drawings and described below. It is to be understood that the invention is not limited to the specific form thereof disclosed herein.

Of the accompanying drawings,

Figure 1 is a front elevation of a testing machine embodying the principles of the invention;

Figure 2 is a side elevation thereof; and

Figure 3 is a side elevation of the machine illustrating the position of the parts after a test is completed.

Referring in detail to the drawings, 10 represents a framework of supporting columns connected by upper and lower crossheads 11 and 12 respectively, carrying bushings 13 and 14 through which a vertical shaft 15 is adapted to reciprocate. Upon a hub and spoke formation 16 attached to shaft 15 is mounted a tire rim 17 adapted to carry tire 18. A supporting table 19 has mounted thereon an anvil 20 of any suitable form to provide an obstruction in the path of the falling tire, the particular form of anvil illustrated in the drawings being a section of car rail which is preferably turned at an angle to the transverse plane of the tire. Shaft 15 may be supported in its upper position by a releasable shackle 21 attached to an eye 22 on the upper end of the shaft and having connected thereto a cord 23 adapted to be pulled by the operator for releasing the shackle. After a test is completed the shackle is again connected to the eye and the shaft raised to its upper position by means of any suitable form of hoist not shown. Shaft 15 is constructed to have sufficient weight to afford considerable momentum when the shaft is dropped. This weight may be added to by an attached weight 24 clamped to shaft 15.

In order to arrest motion of a tire upon its rebound and to prevent a second impact thereof, a ratchet 25 is affixed to shaft 15 and is engageable by a spring-pressed pawl 26 mounted upon cross-head 11.

Pawl 26 is normally held out of engagement with the ratchet by means of a key 27 so that shaft 15 may freely fall on its first descent. When the tire reaches a position adjacent its lower limit of fall, key 27 is disengaged from the pawl by means of a tether 28 attached to the key and to the hub of the wheel. As shaft 15 rebounds pawl 26 will come into engagement with the ratchet, holding the shaft in its upper limit of rebound and preventing any further downward movement.

In the operation of the device, a tire to be tested is mounted about rim 17 while shaft 15 is held in its upper position by shackle 21. Cord 23 is then pulled releasing the shackle and permitting the shaft to fall, carrying the tire from the full-line position in Figures 1 and 2 to the dotted line position shown therein until the tire impacts against anvil 20. The weight of the tire, shaft, etc., and the velocity thereof are such that sufficient momentum is attained to cause failure of a tire of improper construction. At the lower limit of descent key 27 is released permitting pawl 26 to engage ratchet 25 as the latter raises during the rebound of the tire, thus holding the tire in the position shown in Figure 3 at the completion of the test.

It is to be understood that any desired form of anvil may be substituted for the one shown, and that such anvil may be sharper or more blunt and may be turned to any desired angle or position with respect to the tire. A simple and effective machine is thus produced for testing the effect of the impact between an inflated tire and any desired type of obstruction. Modifications of the structure herein disclosed may be resorted to without departing from the spirit of the invention or the scope of the appended claims.

What is claimed is:

1. A testing machine of the class described comprising a reciprocable shaft, a tire-carrying wheel attached to said shaft, an anvil mounted below said wheel, means for supporting said shaft with the wheel in raised position above said anvil, means for releasing said shaft to permit the same to fall until a tire carried by the wheel impacts with the anvil, and means for arresting the motion of the shaft after the tire has rebounded.

2. A testing machine of the class described comprising a reciprocable shaft, a tire-carrying wheel attached to said shaft, an anvil mounted below said wheel, means for supporting said shaft, with the wheel in raised position above said anvil, and means for releasing said shaft to permit the same to fall until a tire carried by the wheel impacts with the anvil.

3. A testing machine of the class described comprising a reciprocable member, a tire-carrying wheel attached to said member, an anvil mounted below said wheel, means for releasably supporting said member above said anvil, and means for releasing the member so as to fall until a tire carried by the wheel impacts with the anvil.

4. A testing machine of the class described comprising a reciprocable member, a tire-carrying wheel attached to said member, an anvil mounted below said wheel, means for releasably supporting said member above said anvil, means for releasing the member so as to fall until a tire carried by the wheel impacts with the anvil, and means for arresting the motion of the wheel after the tire has rebounded.

5. A machine of the class described comprising a reciprocable member, said member being adapted to fall freely means attached to said member for mounting a tire to be tested, and an obstruction mounted in the path of the tire and adapted to impact with the same when the tire is permitted to fall.

6. A testing machine of the class described comprising a reciprocable shaft, means attached to said shaft for mounting a tire to be tested, an obstruction mounted in the path of the tire and adapted to impact with the same when the tire is permitted to fall, and means for arresting the motion of the shaft after the tire has rebounded.

7. A testing machine of the class described comprising a reciprocable shaft, means attached to said shaft for mounting a tire to be tested, an obstruction mounted in the path of the tire and adapted to impact with the same when the tire is permitted to fall, a ratchet affixed to said shaft, and a pawl adapted to engage said ratchet after the tire begins to rebound.

8. In a device of the class described, means for supporting a tire to be tested, an obstruction mounted in the path of the tire and adapted to impact with the same when the tire is permitted to fall, and means for arresting the motion of the tire after the latter has rebounded.

9. In a device of the class described, means for supporting a tire to be tested, an obstruction mounted in the path of the tire and adapted to impact with the same when the tire is permitted to fall, a ratchet affixed to said tire-supporting means, and a pawl adapted to engage said ratchet after the tire begins to rebound.

10. A testing machine of the class described, comprising means for supporting a tire to be tested, an object against which said tire is adapted to impact when the tire and object are conveyed forcibly relatively together, and means for preventing a second impact after the tire rebounds.

In witness whereof I have hereunto affixed my signature this 26th day of May, 1928.

JOHN I. MARTIN.